Figure 1:
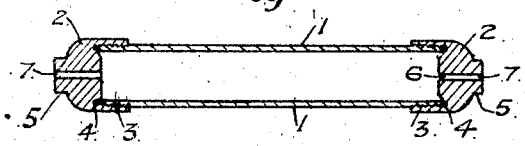
Figure 2:
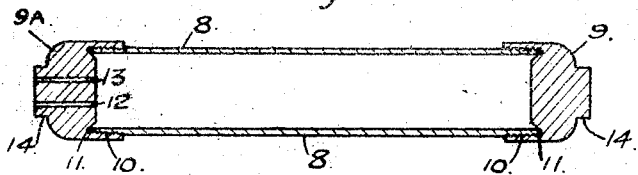
Figure 3:
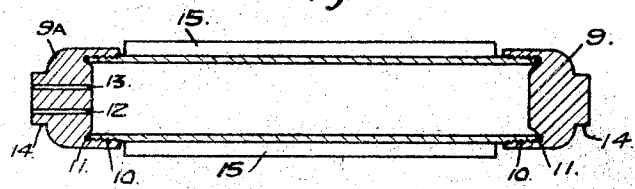
Figure 4:
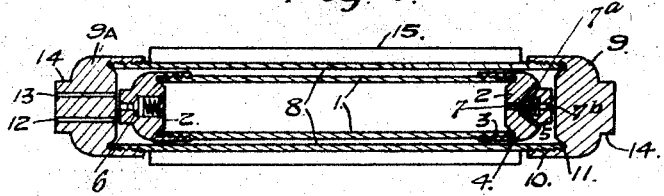

Aug. 25, 1925.

C. L. MARSHALL 1,551,110

VULCANIZING APPARATUS FOR THE MANUFACTURE OF HIGH PRESSURE
EXPANDED VULCANIZED RUBBER AND LIKE SUBSTANCES
Original Filed June 23, 1920

Patented Aug. 25, 1925.

1,551,110

UNITED STATES PATENT OFFICE.

CHARLES LANCASTER MARSHALL, OF LONDON, ENGLAND.

VULCANIZING APPARATUS FOR THE MANUFACTURE OF HIGH-PRESSURE EXPANDED VULCANIZED RUBBER AND LIKE SUBSTANCES.

Original application filed June 23, 1920, Serial No. 391,091. Divided and this application filed March 17, 1922. Serial No. 544,499.

*To all whom it may concern:*

Be it known that I, CHARLES LANCASTER MARSHALL, of "Dunoon", Doyle Gardens, Harlesden, London, England, have invented certain new and useful improvements in and relating to vulcanizing apparatus for the manufacture of high-pressure expanded vulcanized rubber and like substances, of which the following is a specification.

This invention relates to improvements in apparatus for the manufacture of high pressure expanded vulcanized rubber and like substances and is a division of my co-pending application Serial No. 391091 filed 23rd June 1920 (Pat. No. 1,510,791) and refers more particularly to the apparatus for carrying out the vulcanizing process fully described in the specification of the application just referred to, and which apparatus for accomplishing the results, as hereinafter described will enable those familiar with the art to make and use the same.

Figure I numbers 1 to 7 inclusive illustrate that portion of the apparatus which controls the pressures at the beginning and end of the process when applied to the material to be treated. Referring to the drawings the following description will explain the construction of this apparatus which for convenience will be termed the "shell."

*Automatic pressure shell.*

1. Shows a thin steel shell of any suitable size or diameter for the desired manufacture and which is capable of holding a working pressure up to say 14 atmospheres.

2. Are removable steel capped ends suitably screw-threaded to fit upon ends of tube 1 at points 3. At points 4 suitable copper rings or other packing are embedded for the purpose of making gas tight pressure joints.

The removable steel caps 2 are provided with suitable squared ends 5 for the use of devices to remove same from tube 1. At points 6 and 7 are openings through the steel caps 2 which are suitably arranged to remove adjustable check and pressure valves for controlling the pressure automatically at certain parts of the process which will hereinafter be more fully described.

Figure II illustrates that portion of the apparatus which controls and operates the application of the high gas pressure to the "shell" Figure I and for convenience will be termed the "gun".

The high pressure gas apparatus No. 8 illustrates a cold drawn steel tube of suitable dimensions to receive and hold the "shell", Figure I, having a strength capable of being operated safely at a pressure of 75 atmospheres in a temperature of 300° Fah.

No. 9 represents removable steel sealing caps suitably screw-threaded to fit upon screw-threaded ends of tube 8, at points 10, with suitable packing or cooper rings 11, for making gas tight pressure joints.

12 and 13 show openings in the capped ends 9 for the reception of the necessary fittings for the control of the gas pressures within the "gun" and the exhaust of the gases therefrom.

14 illustrates suitable squared ends to caps 9, 9ᴬ, for the purpose of removing from the tube 8, 8.

Figure III illustrates a suitably applied autoclave 15 upon the outside of the gun tube 8 for vulcanizing purposes which can be steam heated in the usual manner to obtain a temperature of 300° Fah. or thereabouts.

Figure IV illustrates the complete assemblage of all the above parts in their respective working positions.

In the operating and use of the apparatus herein described it should be noted that the process can be modified or extended to meet the requirements of a multitude of varying articles of manufacture which cannot be herein described and which it is intended to cover by this patent application. As illustrated by the drawings:—

Figure I shows what is termed as the "shell" and the operation of same is as follows. One of the steel capped ends (2, 2ᵃ) is removed from the shell tube (1) which is then ready to receive its contents within suitable moulds or coverings which will allow of the penetration of the gases to their interior. Such moulds or containers need only be a little stronger than the pressure desired to be obtained in the finished product.

6 indicates a check valve which is arranged in the cap 2 and 7 indicates a valve which is arranged in the cap 2ᵃ and which is held normally closed by a spring 7ᵃ the tension of which may be varied as required by a screw 7ᵇ, so that said valve may be caused to open at any desired pressure, by means of these valves. Pressures from 20 to 200 lbs. or more can be obtained in the shell and arranged to automatically operate and act as the process proceeds. It is intended that the gases may not enter the "shell" under a given pressure and that they do not exhaust during the process of vulcanization below a given pressure.

In order to operate economically the "shell" after receiving its load, and having the steel cap 2 tightly replaced may be placed in a heated chamber of say 200° Fah. and kept there for a period of half an hour or until such time as it is needed and its contents or load is thoroughly heated through. When a substance is required which will contain a pressure of 5 atmospheres when fully expanded, it will have been necessary to set the check and pressure valves to operate at a pressure of 100 lbs. or more before the insertion of the "shell" into the "gun" at Figure II.

Figure II represents the "gun" or the high pressure apparatus for applying the gas pressure to the interior and exterior of the "shell" and is operated in the following manner. The steel capped end 9 is removed after the apparatus has been somewhat cooled down, and the "shell" Figure I is then inserted and the steel cap 9 replaced in its position when it is ready for the application of the high pressure. It will be necessary to use cautionary methods at this juncture as the gas pressure should be applied very carefully and not too fast as the gas will increase in pressure somewhat owing to the heat of the "shell". It should take a few minutes only to bring the pressure up to 100 lbs., when the valve of the interior "shell" will automatically open and allow the gas to enter. At this point, the heat should be applied to the autoclave Figure III, 15 and gradually increased simultaneously with the gas pressure until it reaches the full vulcanizing temperature which is usually about 305° Fah. the degree of heat being dependent upon the mixture. The expansion of the gas will then be at its highest and the pressure should be at or about 70 to 75 atmospheres. It will be necessary to maintain this pressure until the vulcanization is complete which is usually in about two hours, or it may even be longer, or shorter, according to the kind of rubber and amount of vulcanizing agent used. The pressure can be supplied to the apparatus through the medium of high pressure cylinders or high pressure pumps, or by both. At this juncture it is necessary to reduce the heat of the vulcanizing chamber and also necessary to determine the reduction of the gas pressure. It is not necessary to reduce this pressure until the temperature has dropped 50° Fah. and vulcanization has ceased. It is at this point where the judgment of the operator needs to be good as the quality or the fineness of the froth formation is determined, then simply by a quick and active reduction of the pressure, which should take place as rapidly as the exhaust will allow until the entire pressure has left the "gun".

This gives the fine expanded structure which is described.

The dissolved gas in the rubber is minutely divided, as are also the cells of the reticulated structure, and at the end of the vulcanization the mass is more or less liquid which is probably in consequence of over fusion through pressure. When this latter is withdrawn suddenly over fusion disappears and a kind of immediate freezing or hardening of the rubber mass takes place and the gas is trapped in the natural division of the cells which gives the finely divided structure. If on the contrary the pressure is withdrawn slowly (say 10 minutes) the rubber mass congeals slowly before obtaining the resistance of the walls which separate the expanding cells, and the difference of pressure of neighbouring cells brings about a rupture of said walls which causes a number of cells to form into a single one with the result being a coarsely divided structure.

When high pressures of 300 atmospheres or more are used it is practically impossible to form a uniform fine and close texture of the material as is now possible by the herein described process. The finer and closer the texture the stronger is the material.

The pressure which has been trapped in the "shell" by the automatic valve at 100 lbs. or thereabouts will have acted as a resilient counter-pressure to the rapid expansion within the articles in the shell and prevented their disintegration or rupture. This pressure now acts as a flexible mould and exerts an external pressure to the articles within and should be continued until some hours have elapsed and the substance is thoroughly cold and there is no danger of rupture.

The "shell" may be removed from the "gun" as soon as its gas pressure has all been exhausted, and then set aside to cool so that the "gun" may be recharged without loss of time. A number of "shells" can be provided for each "gun" so as to make the process more economical and continuous.

To exhaust the pressure from the "shell" a gas releasing device can be inserted into the outside portion of the opening in the "shell" at 7 which will operate against the valve centre at 6 which will allow the gas to escape and the cap to be removed.

Figure III shows the autoclave covering to the "gun" which may be made of steel and steam heated.

Figure IV illustrates the complete apparatus in working position.

The necessary pressure gauge and safety valves, with outlets and valves to same are provided at all needed points but are not shown.

Claims:

1. In an apparatus for the manufacture of high pressure expanded vulcanized rubber and like substances, a high pressure vulcanizing chamber in combination with a removable inner pressure chamber provided with inlet and outlet valves to control the discharge of the fluid pressure at a predetermined limit by the variation of the external gas pressure.

2. In an apparatus for the manufacture of high pressure expanded vulcanized rubber and like substances, a high pressure vulcanizing chamber in combination with a removable inner pressure chamber provided with inlet and outlet valves which control the entry and discharge of a fluid pressure at two rates of working which pertain to the rates of working of entry and discharge of the gas or fluid at low and high pressures controlled by the variation of the external gas pressure in the gun.

In testimony whereof I affix my signature.

CHARLES LANCASTER MARSHALL.